Nov. 7, 1967    W. L. THOME ET AL    3,351,687
METHOD AND APPARATUS FOR FIRING CERAMIC BODIES
Filed Jan. 8, 1965    4 Sheets-Sheet 1
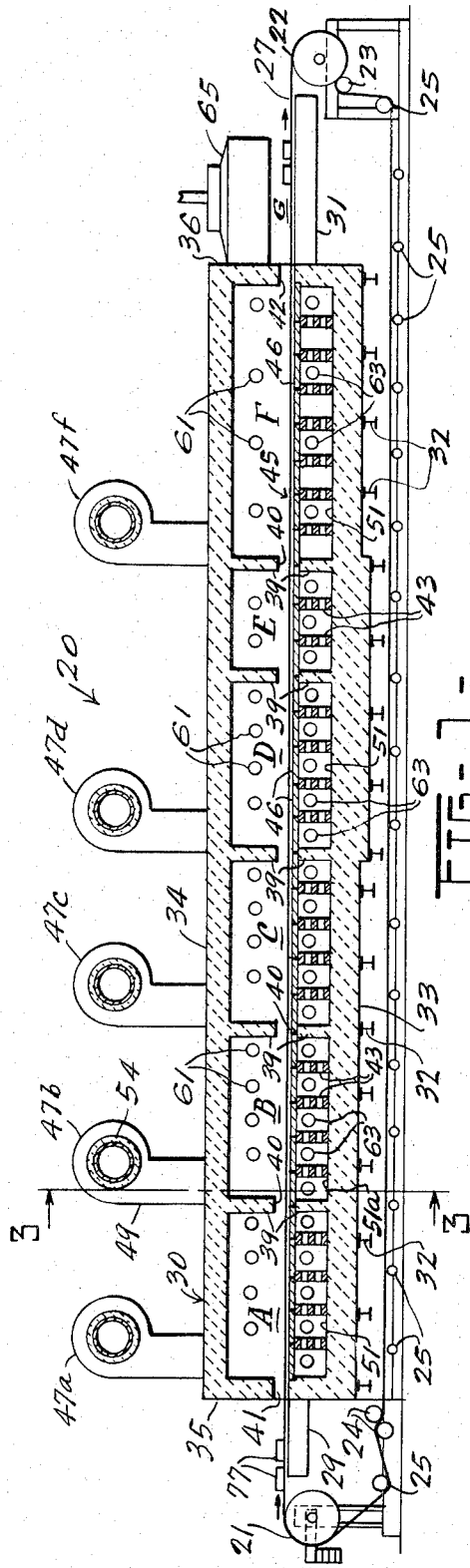
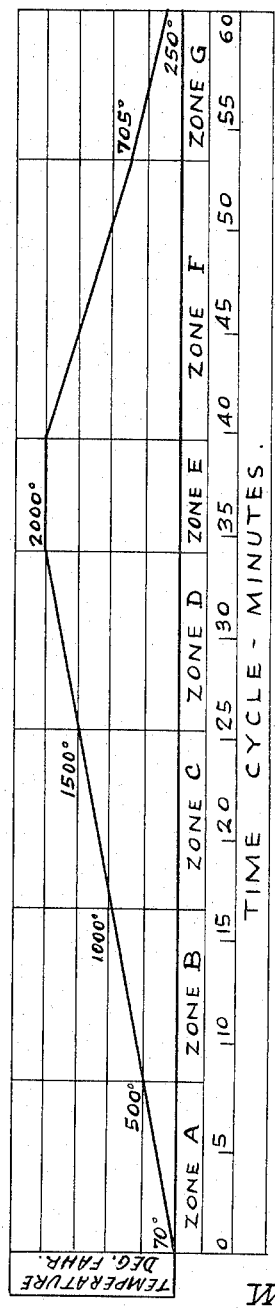
INVENTORS:
WILLIAM L. THOME,
DONALD BEGGS,
JOE B. McCULLY.
BY Owen & Owen
ATT'YS.

Nov. 7, 1967    W. L. THOME ET AL    3,351,687
METHOD AND APPARATUS FOR FIRING CERAMIC BODIES
Filed Jan. 8, 1965    4 Sheets-Sheet 2
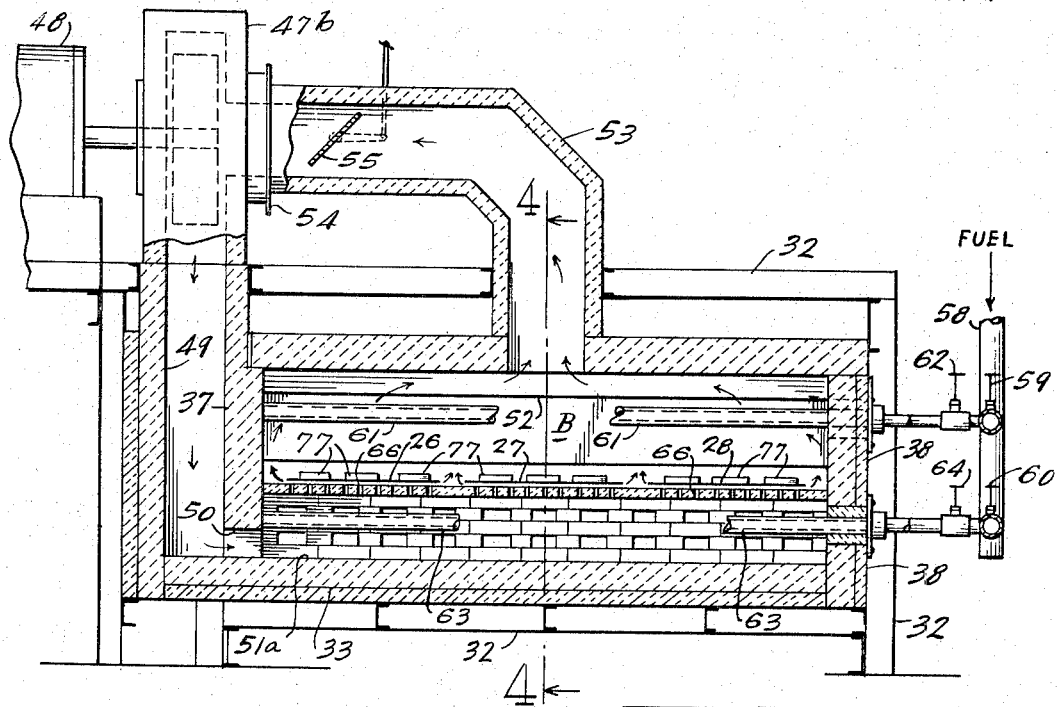
FIG-3-
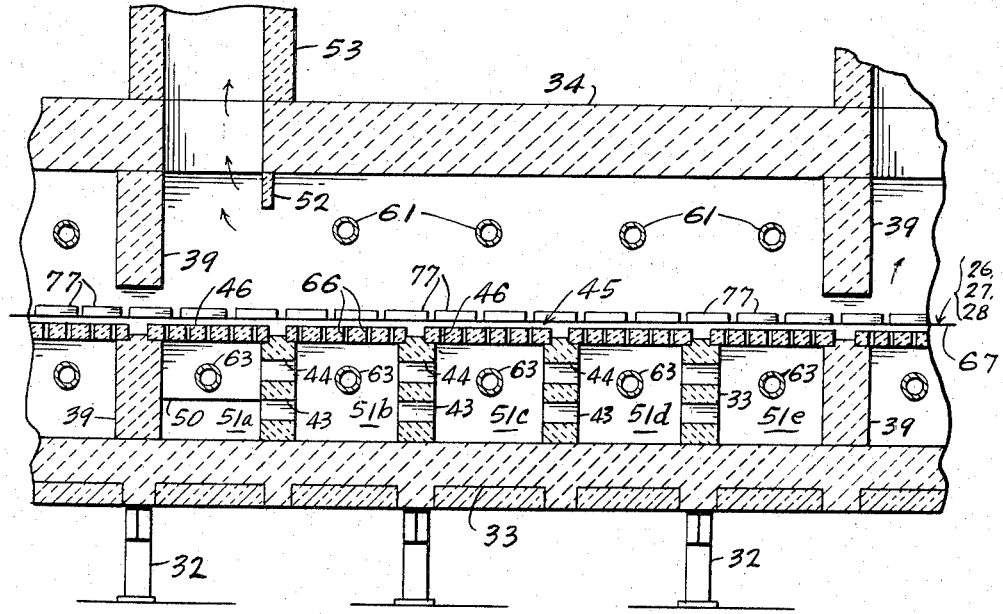
FIG-4-
INVENTORS:
WILLIAM L. THOME,
DONALD BEGGS,
JOE B. McCULLY.
BY Owen & Owen
ATT'YS.

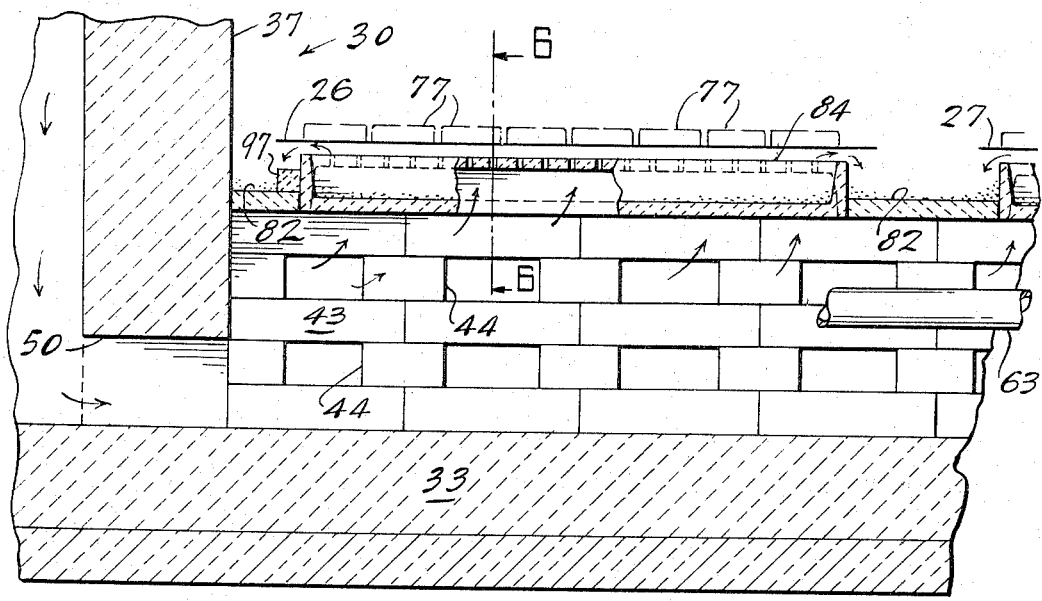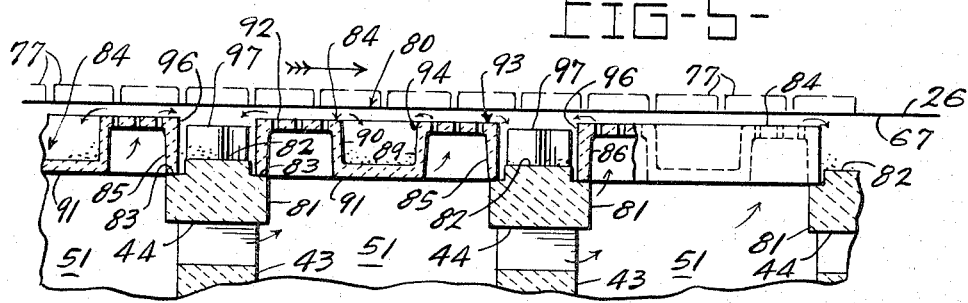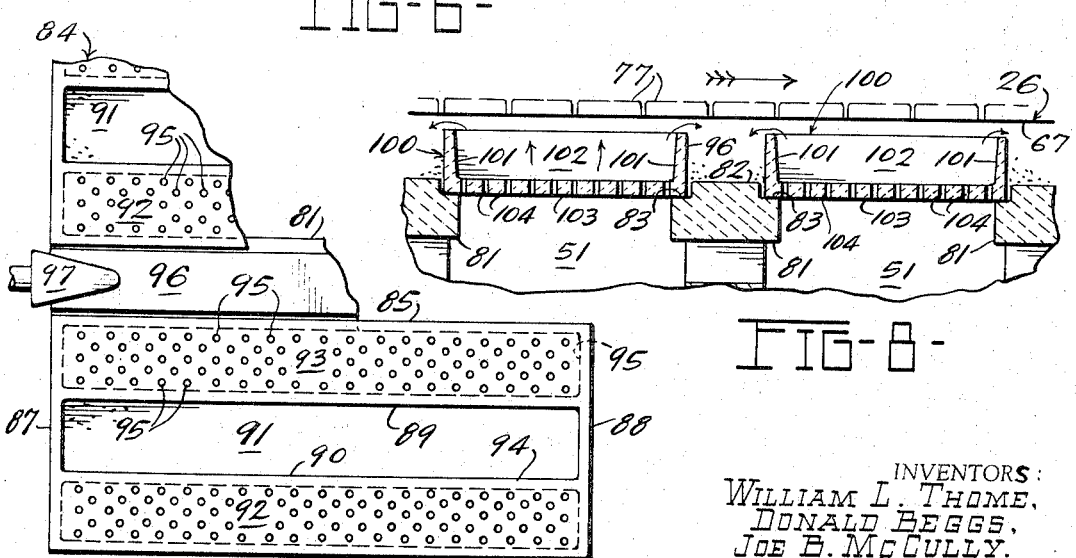

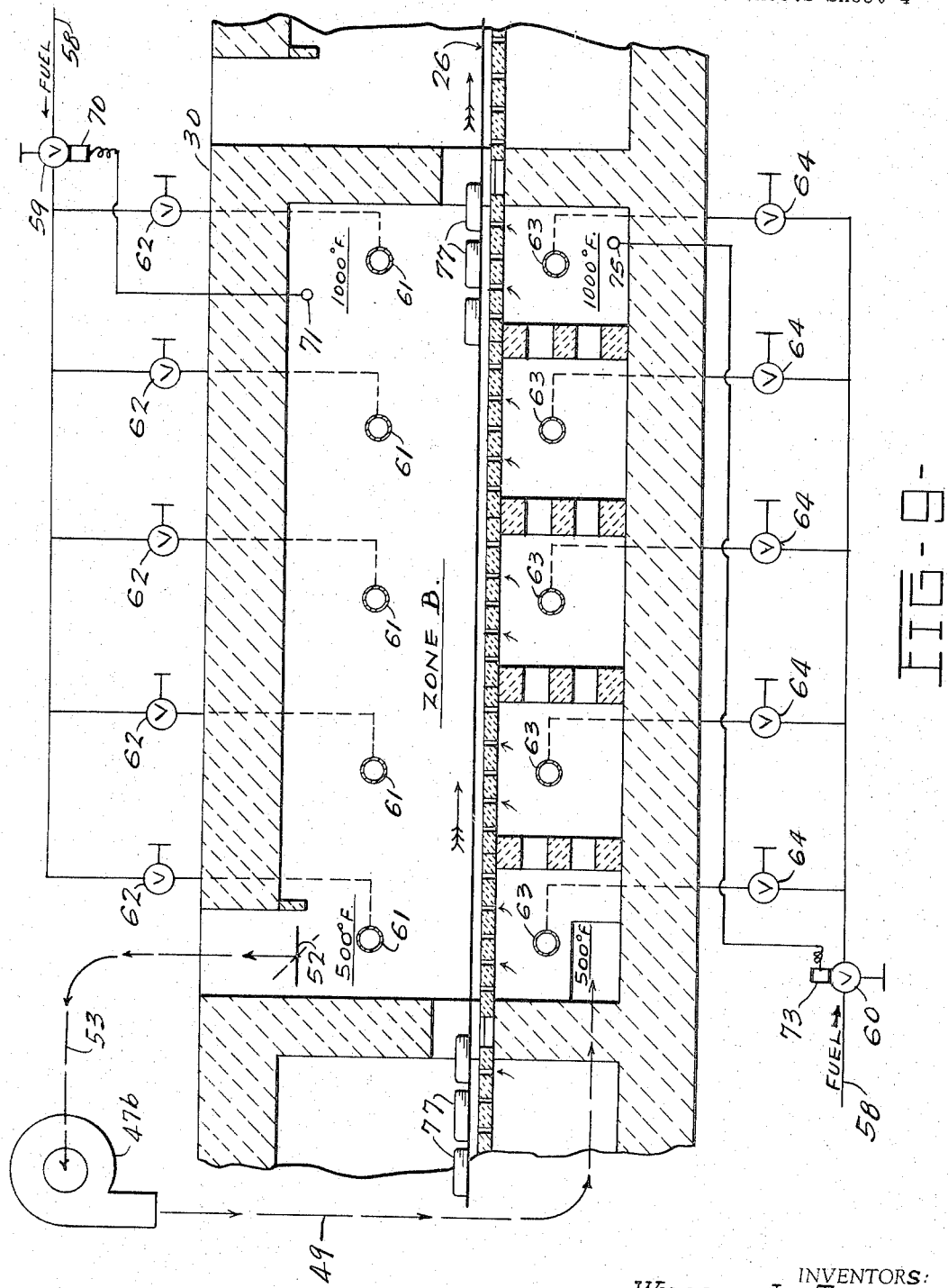

ABSTRACT OF THE DISCLOSURE

This invention relates to a method and apparatus for firing ceramic bodies in a kiln. The kiln has at least one longitudinal belt extending therethrough, the belt having a generally horizontal upper surface and an opposed lower surface. A plurality of green ceramic bodies are placed on the upper surface of the belt and the belt is moved through the kiln. A fluid is directed against the lower surface of the belt toward at least one support region located in an elevated temperature portion of the kiln. The support region is effective to support the belt and the bodies without an appreciable belt catenary and without an appreciable friction drag between the belt and the kiln hearth. The temperature of the kiln is controlled and the ceramic bodies are heated during their movement through the furnace according to a predetermined schedule to cause maturation thereof.

This invention relates to a method and an apparatus for firing ceramic bodies, and, more particularly, to a method and apparatus for firing ceramic bodies in a short period of time.

The firing of ceramic bodies, for examples, ceramic dishware and ceramic tiles, has presented several serious problems to the art. While major improvements have been made in the handling of ceramic body raw materials and in the pressing or forming of such bodies into their desired shapes, corresponding improvements have not been made in the firing operation.

In the past, the firing operation was performed in batch type kilns and the operation, including the cooling cycle, literally took days to perform. Even in more modern firing operations, using tunnel-type kilns, it still takes approximately eight to ten hours to perform the firing operation on ceramic tiles.

In recent years, a continuous roller hearth furnace has been proposed for the "fast" firing of ceramic bodies. The roller hearth furnace is unsatisfactory for several reasons. Because the furnace must be operated at elevated temperatures, it is necessary to construct the rollers of high temperature materials, ceramic rolls having been suggested. Even ceramic rolls have a tendency to fail after a short period of operation. Furthermore, because the rolls must be massive to support the load, there is a physical limitation with respect to their spacing longitudinally of the furnace. Green, or unfired, ceramic bodies placed directly upon spaced rollers might assume a catenary shape and would, therefore, be rejected. To overcome this latter problem, the green bodies are first placed on massive, ceramic supporting fixtures, which are carried through the furnace on the rolls. Because the fixtures are initially expensive and also have a tendency to fail under the thermal shocks to which they are subjected, they further increase the cost of the roller hearth operation. Even more important, much of the heat expended during the firing operation is used to "heat" the fixtures. Therefore, the roller hearth furnace is unsatisfactory from a heat efficiency viewpoint.

Another problem in the art is that of uniformly heating and cooling ceramic bodies which are being fired. For example, it has been found that a satisfactory fired ceramic tile can be assured only if the temperature differential between the lower and upper surfaces thereof, during firing, is not greater than 20° F. Temperature differentials in excess of 20° F. cause "warping" of the tiles and the tiles must be rejected. It has been found that most ceramic bodies cannot stand a severe thermal shock until after their temperature has been lowered to 750° F. during the cooling cycle. Until this stage of firing has been reached the bodies are still plastic and are damaged by a thermal shock.

Still another problem which confronts the prior art is the problem of grit or scale which tends to accumulate on a surface of a ceramic body during the firing operation. Even one or two particles of grit upon an individual high quality ceramic tile will place that tile in a reject category.

It is the primary object of the instant invention to provide a method and apparatus for firing ceramic bodies during a short period of time.

It is a further object to provide a method and apparatus which carries the ceramic bodies through a furnace or kiln without first loading the bodies on or into ceramic supporting fixtures.

It is a still further object of the invention to provide a method and apparatus for carefully controlling the rate of heating and cooling of ceramic bodies during a firing operation.

It is a still further object of the instant invention to provide a method and apparatus for preventing the deposition of grit and scale on ceramic bodies during a firing operation.

It is a still further object of the instant invention to provide a method and apparatus for reducing the friction drag between a ceramic furnace conveyor belt and a ceramic furnace hearth.

It is a still further object of the instant invention to provide a method and apparatus for carefully controlling the temperature differential of opposed temperature zones located above and below ceramic bodies during the firing operation.

Further objects of this invention will become apparent from the following specification and drawings, in which:

FIG. 1 is a partially diagrammatic, vertical sectional view of a continuous firing kiln according to the invention;

FIG. 2 is a diagram showing an example of the relationships between time and temperature in successive zones of the kiln shown in FIG. 1;

FIG. 3 is a fragmentary, vertical sectional view taken along the line 3—3 of FIG. 1 and shown on an enlarged scale;

FIG. 4 is a vertical sectional view taken along the line 4—4 of FIG. 3;

FIG. 5 is a fragmentary, vertical sectional view, with parts broken away, similar to FIG. 4, but showing another embodiment of a hearth means;

FIG. 6 is a fragmentary, vertical view, taken along the line 6—6 of FIG. 5;

FIG. 7 is an enlarged plan view of the embodiment shown in FIGS. 5 and 6;

FIG. 8 is a fragmentary, vertical sectional view, similar to FIG. 6, and showing another embodiment of a hearth means; and FIG. 9 is a fragmentary, partially diagrammatic, vertical sectional view of the kiln shown in FIG. 1 and showing, in particular, temperature control means according to the instant invention.

Briefly, the invention relates to a method and apparatus for firing ceramic bodies in a kiln. The kiln has at least one longitudinal belt extending therethrough, the belt having a generally horizontal upper surface and an opposed lower surface. A plurality of green ceramic bodies are placed in the upper surface of the belt and the belt is moved through the kiln. A fluid is directed against the lower surface of the belt at at least one support region located in an elevated temperature portion of the kiln. The support region is effective to support the belt and the bodies without an appreciable belt catenary and without an appreciable friction drag between the belt and the kiln hearth. The temperature of the kiln is controlled and the ceramic bodies are heated during their movement through the furnace according to a predetermined schedule to cause maturation thereof. Finally, the fired ceramic bodies are removed from the belt.

Referring to FIG. 1 of the drawings, a continuous ceramic tile processing line is generally indicated at 20. While the method and apparatus of the instant invention are related directly to the firing of ceramic tile in this specification, numerous other types of workpieces and ceramic bodies may be fired using the instant method and apparatus. The line 20 comprises individual counterweighted tensioning rolls 21, a common belt drive drum 22, a pinch roll 23, steering rollers 24 and a plurality of idler rolls 25. In the instant embodiment, three continuous heat resistant alloy belts 26, 27 and 28 (see FIG. 3) are mounted on the individual tensioning rolls 21 (FIG. 1), steering rollers 24, idler rolls 25, and the belt drive drum 22. The line 20 also includes an entrance deck 29, a longitudinally extending furnace or kiln generally indicated at 30, and a discharge deck 31.

The kiln 30 includes structural members 32, a bottom 33, a top 34, end walls 35 and 36, and sidewalls 37 and 38. The bottom 33, top 34, end walls 35 and 36, and sidewalls 37 and 38 (FIG. 3), are preferably constructed of fire brick backed up with insulating block. A plurality of longitudinally spaced, opposed, pairs of walls 39 divide the kiln 30 into temperature zones designated by the reference letters A through F. A temperature zone designated by the reference letter G is located adjacent the end wall 36 and the discharge deck 31. Between each of the opposed pairs of intermediate walls 39 is a transverse passageway 40 through which the belts 26, 27 and 28 extend. Similarly, there is a transverse entrance passageway 41 through the end wall 35 and a transverse discharge passageway 42 through the end wall 36.

Checkered walls 43 (see FIG. 4) extend upwardly from the bottom 33 and are spaced longitudinally of the kiln 30. The walls 43 extend between the opposed sidewalls 37 and 38, and have openings 44 of varying sizes extending therethrough.

In the instant embodiment the openings 44 in each of the checkered walls 43 are transversely spaced across the kiln 30. However, in another embodiment (not shown) the openings 44 are only provided in the checkered walls adjacent one of the sidewalls of the kiln. In the next adjacent checkered wall openings are placed in such checkered wall adjacent the opposite sidewall of the kiln. The alternate positioning of the openings in adjacent ones of the checkered walls define a serpentine path for the wind or fluid to follow.

A hearth generally indicated by the reference numeral 45 is constructed of a plurality of hearth members 46 which are supported by the lower ones of the intermediate walls 39 and by the checkered walls 43.

Referring to FIGS. 1 and 3, recirculating blowers 47a, 47b, 47c, 47d and 47f are mounted adjacent the sidewall 37 and are operatively connected to deliver wind to respective ones of the temperature zones A, B, C, D and F. Referring to FIG. 3, the blower 47b which is operatively connected to deliver wind to the temperature zone B, is driven by a motor 48. Wind discharged by the blower 47b blows downwardly through a discharge conduit 49 which is adjacent the sidewall 37, through an opening 50 in the sidewall 37 and into a chamber 51a, which is one of a series of heating and supporting chambers 51 (see FIG. 4). The chamber 51a is bounded by the lower of one of the pairs of intermediate walls 39, one of the checkered walls 43, the sidewalls 37 and 38, the bottom 33, and one of the hearth members 46. A transversely extending recovery header 52 is mounted adjacent the top 34 and discharges into a recovery conduit 53 which is connected to an intake 54 (FIG. 3) of the recirculating blower 47b. A damper control 55 is mounted in the recovery conduit 53 to control the rate of flow of the recirculated wind.

Fuel for heating the kiln 30 is supplied through a fuel header 58 (FIGS. 3 and 9). A master temperature zone control valve 59 controls the rate of fuel delivery to a plurality of upper combustors 61 which are connected to the fuel header 58. Similarly, a master temperature zone control valve 60 controls the rate of fuel delivery to a plurality of lower combustors 63 which are also connected to the fuel header 58. The upper combustors 61 and the lower combustors 63 extend through the sidewall 38 and across the kiln 30. Both the upper combustors 61 and the lower combustors 63, in the instant embodiment are of the ported tube type and the fuel is preferably a gas. An individual control valve 62 controls the rate of fuel delivery to a respective one of the upper combustors 61 and, similarly, an individual control valve 64 controls the rate of fuel delivery to a respective one of the lower combustors 63. In a normal operation the individual control valves 62 and 64 are initially adjusted until the desired temperature gradient is established. All future fuel adjustments during the kiln operating cycle are regulated by the master valves 59 and 60 as will be described below. Each of the lower combustors 64 extends into a respective one of the heating and support chambers 51a–51e (FIG. 4), and each of the upper combustors 61 is preferably positioned above the hearth 45 and aligned with one of the lower combustors 63.

Other types of heating means may be used and still be within the scope of the instant invention. For example, a low pressure velocity jet type burner (not shown) has been found to be effective. The jet type burners are mounted adjacent the sidewalls of the kiln and do not extend across the kiln. Electrical resistance type heating apparatus is another example of heating means contemplated by the present invention.

Referring to FIG. 1, a blower 65 is mounted adjacent the end wall 36 and is spaced vertically from the discharge deck 31. The blower 65 supplies "cooling" heat exchange fluid to temperature zone G and also supplies fluid to the decks 29 and 31, as subsequently discussed in more detail.

In the embodiment shown in FIGS. 1, 3, and 4, the hearth members 46 are generally rectangularly shaped and have a plurality of apertures 66 extending therethrough. Heat exchange fluid, in the instant embodiment gaseous products of combustion, is discharged through the apertures 66 against lower surfaces 67 of the belts 26, 27 and 28. The heat exchange fluid acting upon the lower surfaces 67 of the belts 26, 27 and 28 above each of the hearth members 46 causes regions of static pressure which support the belts 26, 27 and 28 and the workload as will be described in detail below.

Referring to FIG. 2, a time and temperature diagram is shown which indicates the temperature to which a green tile is subjected as it proceeds through the kiln 30. In the present example, the entire firing operation is completed in a sixty minute time cycle. The normal time cycle in prior art "fast" tile firing operations is normally between eight and ten hours. However, even faster time cycles are possible using the method and apparatus of the instant invention.

The temperature through the respective temperature zones rises on a temperature gradient from a low temperature of 70° F. or higher to a maximum temperature of, for example, 2000° F. The temperature remains at 2000° F. across zone E which is the soak zone and then descends on a uniform temperature gradient to a temperature of 250° F. at the discharge end of zone G. It has been found that ceramic bodies cannot withstand a severe thermal shock. The temperature "tilt" shown in FIG. 2, as well as the method and apparatus for achieving such a temperature tilt, is an important feature of the instant invention because it prevents undesirable thermal shocks.

The temperature zone B of the kiln 30 is diagrammatically represented in FIG. 9. A master valve control operating mechanism 70 includes a temperature sensor 71, for example a thermocouple, mounted in the temperature zone B adjacent the discharge end or high temperature end of zone B. The operating mechanism 70 is operatively connected to the master control valve 59 which controls the fuel rate to the individual upper combustors 61. Similarly, a master valve control operating mechanism 73 includes a temperature sensor 74 mounted below the belt 26 adjacent the high temperature end of zone B. The operating mechanism 73 is operatively connected to the master control valve 60 which in turn controls the fuel rate to the individual lower combustors 63. During a typical tile firing operation, zone B is operated at a temperature of 500° F. at its entrance end (left end in FIG. 9) and the temperature ascends uniformly to 1000° F. at its discharge end (right end in FIG. 9). The master valve control operating mechanisms 70 and 73 sense the actual furnace temperatures and automatically open and close respective ones of the master valves 59 and 60 to maintain a uniform temperature gradient extending from 500° F. in the entrance end of zone B to 1000° F. in the discharge end of zone B. The master valve control operating mechanisms 70 and 73 also regulate the master valves 59 and 60 to maintain a uniform temperature within any transverse vertical plane taken through zone B of the kiln 30. Normally it is not necessary to readjust the individual control valves 62 and 64 during a kiln operating cycle. The valves 62 and 64 are set to maintain a predetermined temperature gradient and operating adjustments are controlled by the master valves 59 and 60. The temperature control system described above is effective to maintain the actual kiln temperatures within 20° F. of the design temperatures at any given location within the furnace. It has been found that in the firing of ceramic tile a temperature differential or temperature shock in excess of 20° F. will "warp" the tiles whereby they must normally be rejected.

In a typical ceramic firing operation, the kiln 30 is heated to the operating temperatures shown in FIG. 2. Green ceramic tiles, of the proper moisture content, are placed on the belts 26, 27, and 28, at a location adjacent the entrance end of the kiln 30 (left end in FIG. 1). The blower 65 is actuated and suitable piping (not shown) discharges wind from the blower 65 into the entrance deck 29 and the discharge deck 31. The upper surfaces of the decks 29 and 31 contain a plurality of longitudinally and transversely closely spaced apertures (not shown) which communicate with the interior of each of the respective decks. Gaseous fluid from the blower 65, normally ambient air, passes outwardly through the deck apertures and engages the lower surfaces 67 of the respective belts 26, 27, and 28. The fluid disengages from the lower surfaces 67 both longitudinally and transversely thereof establishing a static pressure or support region adjacent each of the decks 29 and 31. The support regions are effective to support the belts 26, 27, and 28 and the tile workload while preventing any appreciable belt catenary.

Similarly, the blowers 47a, 47b, 47c, 47d, and 47f recirculate a fluid, e.g., heated gaseous products of combustion, to respective ones of the temperature zones A, B, C, D, and F. Fluid is introduced into the heating and supporting chamber 51a by the blower 47b (FIG. 3). A percentage of the fluid is discharged through the apertures 66 (FIG. 4) in the hearth members 46. The fluid engages the lower surfaces 67 of the belts 26, 27, and 28, establishing support regions as described above. The remaining fluid flows through the openings 44 in the adjacent checkered wall 43 into the heating and supporting chamber 51b. Again, a percentage of the fluid flows upwardly through the apertures 66 in the hearth members 46 establishing support regions. The remaining fluid continues to flow through the wind openings 44 in respective ones of the checkered walls 43 until it reaches the chamber 51e. The wind openings 44 have sufficient areas to insure substantially uniform flow of fluid through the apertures 66 of respective ones of the hearth members 46 in successive chambers 51b, 51c, 51d, and 51e.

As the fluid passes upwardly through the respective ones of the chambers 51a–51e, it is heated or cooled by a respective one of the lower combustors 63 to maintain the proper temperatures indicated in FIG. 2. As was explained above, the heating rates of the lower combustors 63 are adjusted to maintain the desired kiln temperatures.

It has been found that, if the support regions described above are not provided, even when high temperature belts, for example made of Inconel, are utilized, the combination of the sliding friction force between the underside of a belt and the hearth and the extremely high temperatures to which the belt is subjected causes the belt to fail after a short period of operation. The friction force generated between the underside of the belt and the hearth is termed "belt friction drag." The method and apparatus disclosed in the instant specification eliminates or minimizes friction drag between the belt and the hearth at least to the extent necessary to enable the belt to convey ceramic bodies through elevated temperature zones of the kiln 30 without support in the kiln 30 other than that provided by the support fluid and the hearth.

In the present embodiment, shown in the drawings, a blower is not provided in the high temperature region E, which is the soak region. In the temperature region E the lower combustors 63 are operated with excess air to provide the fluid necessary to support the belts and the workload.

After the green ceramic bodies 77 have been placed on the respective ones of the belts 26, 27 and 28, the belts are moved longitudinally through the kiln 30. Support fluids are directed against the lower surfaces 67 of the belts thereby providing support regions as was described above. The support regions are spaced apart longitudinally of the respective belts 26, 27, and 28 at predetermined locations and the support regions are effective to support the belts and the ceramic tiles 77 without appreciable belt catenaries or appreciable belt friction drag. The longitudinal spacing of the support regions is generally inversely proportional to the weight of the ceramic bodies being fired. For example, if the workload imposed upon the belts is increased, the support region longitudinal spacing is decreased. However, the inverse relationship between the workload and the spacing is not a linear relationship because as the lower surface 67 of a respective one of the belts 25, 26 and 27, approaches the hearth members 46 the static pressure force increases. This phenomenon occurs because as the belt 26, for example, approaches one of the hearth members 46, the vertical fluid escape planes which are generally contiguous with the boundaries of the hearth member 46 are reduced in their height dimension and this causes a higher escape velocity at such escape planes. The high escape velocity results in a higher static pressure in the support region; therefore, the static pressure force acting on the underside of the belt 26 is increased.

The tiles 77 are fired as they pass through the kiln 30, when they are heated to a maximum or maturation temperature, which in the instant example is 2000° F. After passing through the soak zone E the temperatures of the tiles 77 are progressively lowered. Ceramic bodies cannot stand a severe thermal shock and by using the method and apparatus of the instant invention the tiles 77 are fired and subsequently cooled without subjecting them to a damaging thermal shock even though the entire firing cycle is of a one hour duration. Finally, the tiles 77 are removed from the respective belts 26, 27 and 28 after passing above the discharge deck 31.

Referring to FIGS. 5, 6, and 7, another embodiment of a hearth, according to the instant invention is generally indicated by the reference numeral 80. In this embodiment, the checkered walls 43 include a cap 81 (FIG. 6) which extends transversely across the kiln 30. The cap 81 has an upper surface 82 and opposed support recesses 83 adjacent the upper surface 82. Specially shaped hearth members 84 are mounted in the support recesses 83 of the caps 81. Referring to FIG. 7, the hearth members 84 are rectangularly shaped and include sidewalls 85 and 86, opposed end walls 87 and 88, intermediate walls 89 and 90, a bottom wall 91 extending between the intermediate walls 89 and 90, and opposed top hearth pads 92 and 93 which extend between the sidewall 86 and the intermediate wall 90 and between the intermediate wall 89 and the sidewall 85 respectively. The end walls 87 and 88, the intermediate walls 89 and 90, and the bottom wall 91 define a particle chamber 94. Apertures 95 are provided in each of the hearth pads 92 and 93. During operation fluid is directed from one of the heating and support chambers 51 upwardly against the lower surface 67 of, for example, the belt 26. The sidewalls 85 and 86 of spaced apart hearth members 84 and the upper surface 82 of the cap 81 define air escape passageways 96, which extend transversely with respect to the kiln 30 (see FIGS. 6 and 7).

It has been found that the particle chamber 94, located between opposed hearth pads 92 and 93, aids in equalizing the static pressures transversely or across respective ones of the belts 26, 27, and 28. In this embodiment, part of the fluid disengages from the underside of each belt, in a direction longitudinal of the belt, and flows into a respective chamber 94. The fluid then flows, within the chamber 94, outwardly toward the end walls 87 and 88. This fluid path is preferable because by equalizing the static pressures it reduces the tendency of the belt to bow whereby the longitudinal centerline of the belt is elevated above the edges of the belt.

Wedge members 97 are placed at opposed ends of each of the air escape passageways 96 adjacent the sidewalls 37 and 38 of the kiln 30, and also within escape passageways (not shown) located between the belts 26 and 27 and the belts 27 and 28. The wedge members 97 act as dampers to regulate fluid pressures. When one of the wedge members 97 is moved inwardly toward the center of the kiln (toward the right in FIG. 7) the fluid pressure is increased in the air escape pasageway 96. A corresponding increase in fluid pressure occurs in the static pressure regions which are adjacent the escape passageway 96. It should be noted that other types of control means may be utilized to regulate fluid pressures within the air escape passageways 96.

It has been found that even high temperature alloy belts, for example Inconel belts, have a tendency to scale or flake when subjected to elevated operating temperatures. Also, the hearth members 84, which are constructed of a suitable high temperature ceramic, often deposit grit particles during the firing operation. When a high quality final workpiece is required, for example, a high quality ceramic tile, one piece of grit on the finished surface will place the tile in a reject category.

Referring to FIGS. 5, 6, and 7, gaseous fluid is directed upwardly through each of the heating and supporting chambers 51; through the apertures 95 in the hearth pads 92 and 93; and, into engagement with the lower surfaces 67 of the belts. In this embodiment, the majority of the fluid disengages from the lower surface 67 longitudinally of the belts 26, 27, and 28, into the escape passageways 96, thence outwardly toward the sidewalls 36 and 37 of the kiln 30. Fluid also escapes upwardly from the passageways 96, through the openings between the belts 26 and 27 and the belts 27 and 28, respectively. Because the majority of the fluid disengages in a direction longitudinal of the belts, transverse pressure differentials created across the lower surfaces 67 are minimized. A region of static pressure is established immediately above each of the hearth members 84 which at least partially supports the weight of the respective belt and the tile load. Therefore, the friction drag between the belt 26, for example, and the hearth 80 is greatly reduced.

If a piece of grit from, for example, one of the hearth members 84 or a piece of scale from the belt 26 disengages it tends to fall downwardly into one of the particle chambers 94 or into one of the escape passageways 96 rather than to be blown outwardly and deposited upon one of the tiles 77 which is being conveyed upon an adjacent belt. Even though the hearth members 84 are more difficult to form and more expensive than the hearth members 46, previously described, the grit collecting capabilities of the embodiment disclosed in FIGS. 5, 6, and 7 makes its use commercially feasible.

Referring to FIG. 8, another embodiment of a hearth member according to the instant invention, is generally indicated by the reference numeral 100. The hearth member 100 is generally box shaped, having sidewalls 101, end walls 102, and a bottom 103. A plurality of apertures 104 extend through the bottom 103. Fluid moves upwardly through the apertures 104 and engages the lower surface 67 of, for example, the belt 26. The majority of the fluid disengages from the lower surface 67 essentially longitudinally of the belt 26 into the escape passageways 96 located between adjacent ones of the hearth members 100. As described above, this establishes a support region of static pressure which at least partially supports the belt and the workload. Grit or other types of debris fall downwardly into the hearth member 100 or downwardly into the escape passageways 96 and are not blown outwardly onto the surfaces of the tiles 77.

While the present invention has been disclosed in connection with a specific arrangement of parts, it is to be expressly understood that numerous modifications and changes can be made without departing from the spirit and scope thereof as defined in the appended claims.

What we claim is:

1. Apparatus for firing ceramic bodies comprising, in combination, a longitudinally extending kiln, at least one generally horizontally extending belt, having upper and lower surfaces, positioned within said kiln, means for moving said belt through said kiln, a plurality of longitudinally spaced apart, and vertically extending intermediate walls positioned within said kiln, said walls and said kiln defining successive temperature compartments, means for supplying heat to each of said compartments, at least one support chamber within each of said compartments, each of said support chambers having a top member adjacent to the lower surface of said belt, said top member defining a plurality of openings therein, and means for supplying a pressurized fluid to each of said support chambers.

2. Apparatus for firing ceramic bodies comprising, in combination, a longitudinally extending kiln, at least one horizontally extending belt, having upper and lower surfaces, positioned within said kiln, means for moving said belt through said kiln, means for supplying heat to said kiln, and support means for said belt and such bodies comprising, a plurality of support chambers longitudinally spaced within said kiln, each of said support chambers having a generally horizontal hearth member adjacent to the lower surface of said belt, said hearth member defining a plurality of generally vertical fluid openings therethrough, and means for supplying a pressurized fluid to each of said support chambers, whereby the fluid passing upwardly through such fluid openings in said hearth member engages said belt.

3. Apparatus for firing ceramic bodies, comprising, in combination, a longitudinally extending kiln, at least one horizontally extending belt, having opposed upper and lower surfaces, positioned within said kiln, means for moving said belt through said kiln, a plurality of longitudinally spaced apart and vertically extending intermediate walls, having belt passageways therethrough, positioned within said kiln, said walls and said kiln defining successive temperature compartments, a plurality of longitudinally spaced transverse chamber walls extending upwardly from the bottom of said kiln in each of such temperature compartments, said chamber walls each having an upper portion spaced below the bottom surface of said belt, a generally horizontal hearth, having fluid openings extending therethrough, mounted adjacent the upper portions of said chamber walls beneath said belt, said chamber walls, said kiln, and said hearth defining a plurality of supporting chambers in each of said temperature compartments, lower heating means positioned in respective ones of said support chambers, upper heating means positioned in each of said temperature compartments above the upper surface of said belt, means for controlling the upper and lower heating means to maintain a predetermined temperature gradient within a respective one of said temperature compartments, and means for recirculating a fluid through respective ones of said temperature compartments, whereby fluid passing upwardly from a respective one of such supporting chambers through such fluid openings engages the lower surface of said belt.

4. Apparatus, according to claim 3, wherein said upper heating means comprises a plurality of longitudinally spaced upper gas fired combustors positioned in said kiln above such upper surface of said belt, and said lower heating means comprises a plurality of lower gas fired combustors capable of operating under excess air conditions, positioned within respective ones of said support chambers.

5. Apparatus, according to claim 4, wherein said control means comprises, first valve means effective to regulate the fuel rate to said upper combustors, second valve means effective to regulate the fuel rate to said lower combustors, and temperature sensing means positioned within a respective one of said temperature compartments, said temperature sensing means being operatively connected to said first and second valve means, respectively, and being effective to open and close said valve means when the actual compartment temperature differs with respect to such predetermined temperature gradient.

6. Apparatus, according to claim 3, wherein said hearth comprises a plurality of hearth members, each of said hearth members defining a plurality of generally vertical apertures extending therethrough, each of said hearth members having a bottom and a border wall extending upwardly from said bottom adjacent the periphery of said bottom, said border wall and said bottom defining a particle chamber which is spaced below the lower surface of said belt.

7. Apparatus for heat treating workpieces comprising, in combination, a longitudinally extending furnace, at least one generally horizontal belt, having upper and lower surfaces, positioned within said furnace, means for moving said belt through said furnace, a plurality of longitudinally spaced apart intermediate walls positioned within said furnace, said intermediate walls and said furnace defining successive temperature compartments, a plurality of longitudinally spaced, transverse chamber walls extending upwardly from the bottom of said furnace in each of said temperature compartments, said chamber walls each having an upper portion spaced below the bottom surface of said belt, a generally horizontal hearth, having fluid openings extending therethrough, mounted adjacent the upper portions of said chamber walls beneath said belt, said chamber walls, said furnace, and said hearth defining a plurality of supporting chambers in each of said temperature compartments, heating means positioned in respective ones of said temperature compartments, control means effective to maintain a predetermined temperature gradient within respective ones of said temperature compartments, and means for introducing a pressurized fluid into respective ones of said supporting chambers, whereby fluid passing upwardly from said supporting chambers, and through such fluid openings in said hearth, engages the lower surface of said belt at longitudinally spaced apart support regions thereby at least partially supporting said belt and such workpieces.

8. Apparatus for fast firing ceramic tiles, comprising, in combination, a longitudinally extending kiln, at least one horizontally extending temperature resistant belt, having upper and lower surfaces, positioned within said kiln, means for moving said belt through said kiln, a plurality of longitudinally spaced and transversely extending dividers positioned within said kiln, said dividers and said kiln defining successive temperature compartments, a plurality of longitudinally spaced transverse chamber walls extending upwardly from the bottom of said kiln in each of said temperature compartments, said chamber walls defining a plurality of generally horizontal wind openings, having predetermined cross-sectional areas extending therethrough, a generally horizontal hearth mounted beneath said belt, said hearth, said chamber walls, and said kiln defining a plurality of supporting chambers in each of said temperature compartments, said hearth comprising a plurality of hearth members spaced apart longitudinally of said furnace, adjacent ones of said hearth members defining therebetween a plurality of transversely extending fluid escape passageways, means for regulating fluid pressures within such fluid escape passageways, each of said hearth members defining a plurality of fluid openings extending therethrough, each of said hearth members having a bottom and a border wall extending upwardly from said bottom adjacent the periphery of said bottom, said border wall and said bottom defining a particle chamber, heating means positioned within respective ones of said supporting chambers, means for controlling the heating means to maintain a predetermined temperature gradient within each of said temperature compartments, and circulating means for introducing a fluid into respective ones of said supporting chambers, whereby fluid passing upwardly through such fluid openings in said hearth members engages the lower surface of said belt at longitudinally spaced apart support regions.

References Cited
UNITED STATES PATENTS

| | | | |
|---|---|---|---|
| 1,071,663 | 8/1913 | Burley et al. | 25—142 |
| 1,602,721 | 10/1926 | Straight | 25—142 |
| 1,708,124 | 4/1929 | Dedough | 25—142 |
| 2,218,935 | 10/1940 | Ingersoll | 25—142 X |
| 2,328,909 | 9/1943 | Kilborn | 18—6 X |
| 2,387,886 | 10/1945 | De Vol. | |
| 3,108,351 | 10/1963 | Hermans | 25—142 |

WILLIAM J. STEPHENSON, *Primary Examiner.*